US005463298A

United States Patent [19]

Kamio et al.

[11] Patent Number: 5,463,298

[45] Date of Patent: Oct. 31, 1995

[54] APPARATUS FOR DETECTING REFERENCE POSITION OF SERVO-CONTROLLED MEMBER

[75] Inventors: Shigeru Kamio, Nagoya; Mitsuo Hara, Aichi; Hitoshi Tasaka, Chiryu, all of Japan

[73] Assignee: Nippondenso Co., Ltd., Aichi, Japan

[21] Appl. No.: 69,708

[22] Filed: Jun. 1, 1993

[30] Foreign Application Priority Data

Jun. 1, 1992 [JP] Japan .................................... 4-140743

[51] Int. Cl.$^{6}$ .................................................... B60K 26/04

[52] U.S. Cl. .......................... 318/599; 388/811; 477/175; 477/180; 192/103 R

[58] Field of Search .................................... 318/599, 560, 318/600, 52, 587; 388/815, 811; 123/339, 361, 198 B, 349; 74/866–867, 645, 869, 733; 192/3.3, 4 A, 21.5, 103 R; 474/11, 28, 18; 477/175, 180

[56] References Cited

U.S. PATENT DOCUMENTS

| | | | |
|---|---|---|---|
| 3,805,640 | 4/1974 | Schneider et al. | 74/645 |
| 4,056,089 | 11/1977 | Ratliff | 123/198 B |
| 4,547,178 | 10/1985 | Hayakawa et al. | 474/11 |
| 4,714,864 | 12/1987 | Yoga et al. | 318/52 |
| 4,805,751 | 2/1989 | Ohkuma et al. | 192/103 R |
| 4,823,749 | 4/1989 | Eisenmann et al. | 123/361 |
| 4,986,396 | 1/1991 | Morimoto | 192/0.052 |
| 5,012,910 | 5/1991 | Miyawaki | 192/4 A |
| 5,067,372 | 11/1991 | Suzuki | 74/866 |
| 5,099,719 | 3/1992 | Hibi et al. | 74/866 |
| 5,161,433 | 11/1992 | Sakakibara et al. | 474/18 |
| 5,252,902 | 10/1993 | Uehara et al. | 318/599 |

FOREIGN PATENT DOCUMENTS

| | | |
|---|---|---|
| 58-10131 | 1/1983 | Japan . |
| 59-144132 | 9/1984 | Japan . |
| 61-54329 | 3/1986 | Japan . |
| 183146 | 6/1989 | Japan . |
| 1145959 | 10/1989 | Japan . |
| 222643 | 2/1990 | Japan . |

*Primary Examiner*—William M. Shoop, Jr.
*Assistant Examiner*—John W. Cabeca
*Attorney, Agent, or Firm*—Cushman, Darby & Cushman

[57] ABSTRACT

An apparatus that detects a reference position of a throttle valve. The throttle valve is forced in either a valve opening direction or a valve closing directions by an urging member. A DC motor, which is connected to the throttle valve, drives the throttle valve against the force created by the urging member within a rotatable angle that is restricted by a stopper. A throttle valve opening sensor detects an opening angle of the throttle valve. A lock current detecting circuit detects a lock current created by the DC motor when the DC motor is brought into contact with the stopper. A throttle valve reference position renewing circuit updates the reference position, which is memorized in a throttle valve reference position memory, on the basis of an opening angle of the throttle valve, which is detected by the throttle valve opening sensor, when the lock current detecting circuit detects the lock current.

14 Claims, 10 Drawing Sheets

APPARATUS FOR DETECTING REFERENCE POSITION OF SERVO-CONTROLLED MEMBER

BACKGROUND OF THE INVENTION

1. Field of the Invention:

The present invention relates to an apparatus for detecting a reference position of a servo-controlled member such as a throttle valve of an internal combustion engine, and more particularly to a servo-driving apparatus which includes a DC motor controlling the position of the movable member, wherein a reference position of the movable member is detected by a reference position detecting apparatus having a novel constitution.

2. Description of the Prior Art:

A known prior art, e.g. Unexamined Japanese Patent Application No. SHO 58-10131, has disclosed a method of detecting a reference position of the throttle valve, in which a fully opened position or a completely closed position of the throttle valve is repeatedly detected to obtain a reference position of the throttle valve through learning process on the basis of the detected throttle valve opening angle. In more detail, this prior art has introduced a specially provided switch for detecting a completely closed position of the throttle valve. This switch is cooperatively associated with a conventional throttle valve opening sensor which generates a linear output in response to the detected opening degree of the throttle valve. The following is the reason why such a special switch is required.

The throttle valve opening sensor is normally accurate in the detection of how much angle the throttle valve is opened or closed, but is incapable of accurately detecting how completely the throttle valve is closed. Because, a significant amount of installation error is inevitable in the assembling of the throttle opening degree sensor onto the throttle valve.

Therefore, above special switch (referred to as a complete close switch, hereinafter) is utilized to compensate such a deficiency of the throttle valve opening sensor. That is, in operation, an output signal of the throttle valve opening sensor, generated when the complete close switch is depressed by the throttle valve at the completely closed position, is memorized as a reference position representing a complete close position of the throttle valve.

However, the installation of the complete close switch is never free from the error. As the computer-based engine control has been advanced, an accuracy in the detection of the complete close position has been becoming important and therefore will be more severely required in the future. For this reason, even if an installation error of the complete close switch remains within a narrow range, it may not be acceptable for the present-day and future precise engine control. It is therefore feared that small installation error of the complete close switch will give an adverse affect to an overall control of the throttle valve opening degree.

On the other hand, there has been conventionally known a method of detecting a lock current of the DC motor. This lock current, flowing through a resistance provided in series with the DC motor, is detected in such a case where the driving motor is forcibly stopped by an obstacle or the like. The circuit for detecting this lock current, however, tends to be complicated in construction and large in size because of necessity of providing at least the following three components, i.e. a resistance detecting lock current, an amplifier circuit for amplifying an output voltage obtained from the resistance, and a conversion circuit for converting the analogue output of the amplifier circuit into a digital signal.

SUMMARY OF THE INVENTION

Accordingly, the present invention has a purpose, in view of above-described problems or disadvantages encountered in the prior art, to detect a motor lock condition through a simplified detecting apparatus. Another purpose of the present invention is utilizing this motor lock result for adjustment of a reference position of the servo-controlled member such as a throttle valve.

In order to accomplish the above purposes, a first aspect of the present invention provides a servo control apparatus comprising: a DC motor; a position detecting means for producing a detection signal representing a rotational position of said DC motor; a target command means for producing a command signal representing a target rotational position of said DC motor; a duty control means for determining a duty-ratio signal to be supplied to said DC motor on the basis of a deviation between said detection signal fed from said position detecting means and said command signal fed from said target command means, so as to supply said DC motor with a current adjusted in accordance with said determined duty-ratio signal; and a motor lock judging means for inputting said duty-ratio signal produced in said duty control means and making a judgement on the basis of this inputted duty-signal as to whether or not said DC motor is in a locked condition.

In this first aspect, it is preferable that the servo control apparatus further comprises a reference position memory means for memorizing a reference position corresponding to said detection signal fed from said position detecting means when the lock condition of said DC motor is detected by said motor lock judging means.

Furthermore, it is also preferable that said duty control means performs at least an integral control in accordance with said deviation between said detection signal fed from said position detecting means and said command signal fed from said target command means.

Moreover, in accordance with a second aspect of the present invention, there is provided an apparatus for detecting a reference position of a throttle valve comprising:

- a throttle valve being urged by an urging member in either direction of a valve opening direction and a valve closing direction;
- a DC motor, connected to said throttle valve, for driving said throttle valve against the urging force of said urging member within a rotatable angle restricted by a stopper member;
- a throttle opening sensor for detecting an opening angle of said throttle valve;
- a lock current detecting means for detecting a lock current caused in said DC motor when the DC motor is brought into contact with said stopper;
- a throttle valve reference position memory means for memorizing a reference position of said throttle valve; and
- a throttle valve reference position renewing means for renewing said reference position memorized in said throttle valve reference position memory means on the basis of an opening angle of the throttle valve detected by said throttle opening sensor when said lock current detecting means detects the lock current.

Still further, a third aspect of the present invention provides an apparatus for detecting a reference position of a servo-controlled throttle valve comprising:

a DC motor which is supplied with exciting current by a driving circuit;

a duty control means for producing a duty-ratio signal to control said DC motor, said duty-ratio signal being obtained on the basis of a deviation between an actual throttle position value representing an actual throttle position value and a command value representing a target throttle position, so as to equalize the actual throttle position value with the command value;

a position detecting means for detecting said actual throttle position value;

a target value command means for determining said command value;

a motor lock judging means for monitoring a motor lock condition; and a memory means for storing a reference value representing a reference position of said throttle valve, said memory means renewing said reference value on the basis of the actual throttle position value detected by said position detecting means at the moment when said motor lock judging means detects the motor lock.

Above and other objects, features and advantages of the present invention will become more apparent from the following detailed description which is to be read in conjunction with the accompanying drawings.

DETAILED DESCRIPTION OF THE PREFERRED EMBODIMENT

Hereinafter, with reference to accompanying drawings, a preferred embodiment of the present invention will be explained in detail.

First of all, a novel apparatus for detecting a reference position of a servo-controlled throttle valve will be explained with reference to a schematic diagram of FIG. 11.

A DC motor M1 is supplied with exciting current by a driving circuit M2. A rotational position of the DC motor M1 is precisely adjusted by the duty control (i.e. servo control). A duty-ratio signal Duty, supplied to the DC motor M1, is generated from a duty control means M3, which obtains the duty-ratio signal Duty on the basis of a deviation $\epsilon$ between a command value Cmd representing a target position and an actual throttle position value Th, so as to equalize the actual throttle position value Th with the command value Cmd. The actual throttle position value Th is detected by a position detecting means M4. The command value Cmd is obtained by a target value command means MS.

Figure 11:
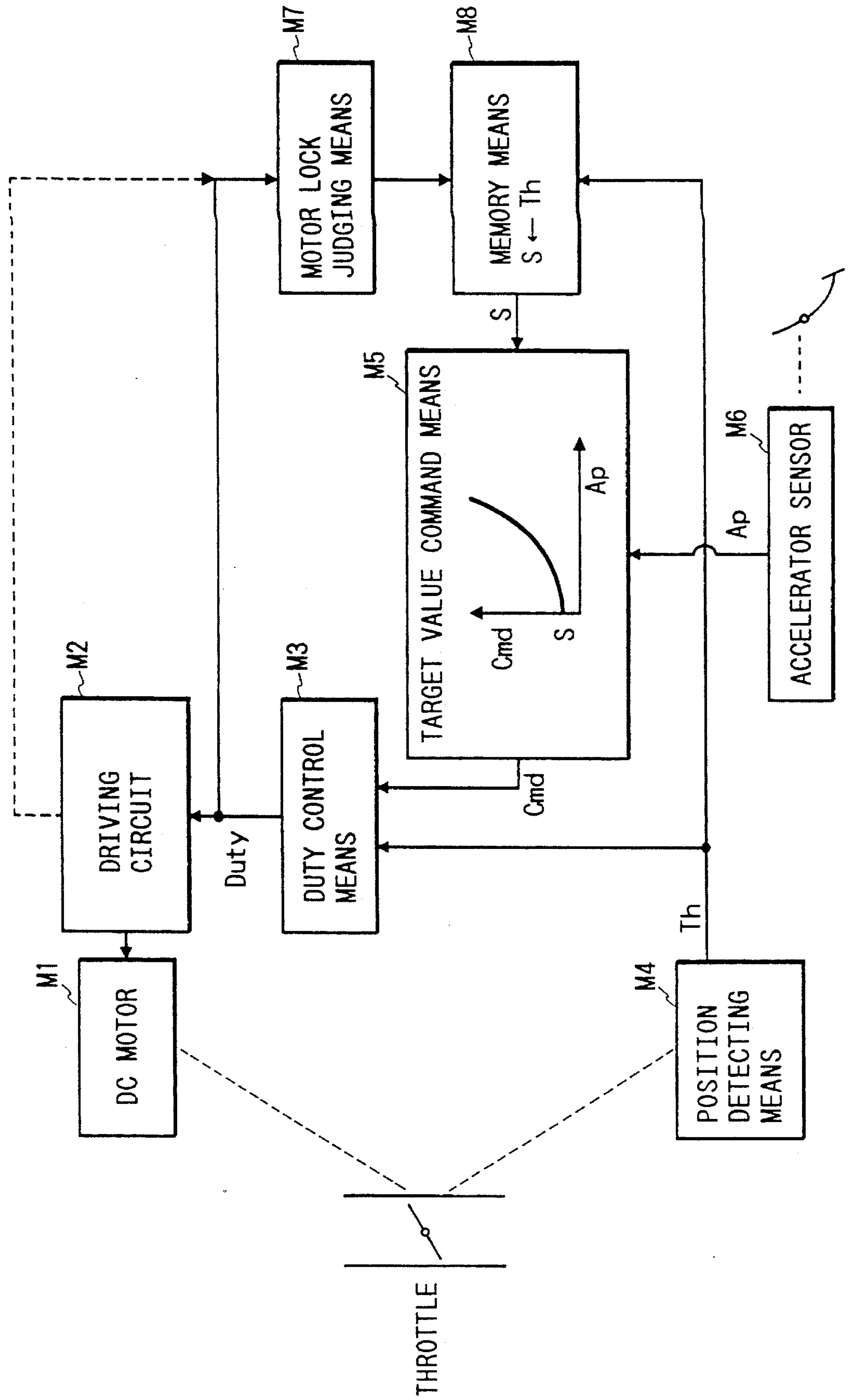
FIG. 11 is a schematic diagram showing an essential constitution of the apparatus for detecting a reference position of a throttle valve in accordance with the present invention.

The target value command means M5 memorizes a target value characteristic shown in FIG. 11, on the basis of which the target value command means M5 obtains a command value Cmd corresponding to an accelerator depression amount Ap obtained by an accelerator sensor M6. The target value characteristic curve defines a reference value S as a minimum value of the command value Cmd.

The DC motor M1 is locked after having reached the reference position. Once the DC motor is locked, the deviation $\epsilon$ between the command value Cmd and the actual throttle position value Th no longer converges at 0. In this condition the duty-ratio signal Duty, supplied to the DC motor M1, is continuously maintained at a significant large value. Therefore, the locked condition of the DC motor M1 can be indirectly known from the detection of such a duty-ratio signal condition. In other words, the detection of the motor lock condition makes it possible to judge whether or not the DC motor M1 has reached the reference position. The motor lock judging means M7 inputs the duty-ratio signal Duty from the duty control means M3 for monitoring whether the DC motor M1 has been locked or not on the basis of the fact that the duty-ratio signal Duty exceeds a predetermined value continuously for more than a predetermined period of time.

The motor lock condition can be also detected by checking the motor lock current. As soon as the DC motor M1 reaches at the reference position, the DC motor M1 is locked and generates a lock current. This lock current, detected upon the motor lock, is fed from the driving circuit M2 to the motor lock judging means M7 as shown by a dotted line in FIG. 11. The motor lock judging means M7 makes a judgement as to whether the DC motor M1 has been locked or not on the basis of the fact that the motor current exceeds a predetermined value continuously for more than a predetermined period of time.

Furthermore, the motor lock judging means M7 sends a memory means M8 a signal notifying that the DC motor M1 has reached the reference position. Upon reception of this signal, the memory means M8 calculates the reference value S based on the actual throttle position value Th detected at this moment and memorizes the resultant value S.

The memory means M8, for example, cancels the already memorized reference value S and newly stores the actual throttle position value Th detected at the reference position as a renewed reference value S. Otherwise, it will be also possible for the memory means M8 to modify the reference value S by a predetermined amount so as to reduce the difference between the reference value S and the actual throttle position value Th detected at the reference position. Thus renewed reference value S is fed from the memory means M8 to the target value command means M5, wherein the command value Cmd is calculated on the basis of this renewed reference value S.

Through a well-known control procedure including an integral control, the duty-ratio signal will be preferably produced in accordance with the deviation 6 between the command value Cmd and the actual throttle position value Th. The merit of utilizing the integral control will be apparent in the detection of the DC motor lock condition. That is, the deviation ε, continuously generated after the DC motor M1 has been locked, makes the duty-ratio signal Duty change widely. This wide variation of the duty-ratio signal Duty is helpful to clearly find out the motor lock condition.

It will be preferable to use the micro computer for the production of the duty-ratio signal, since the micro computer has a capability of quick processing.

Figure 2:
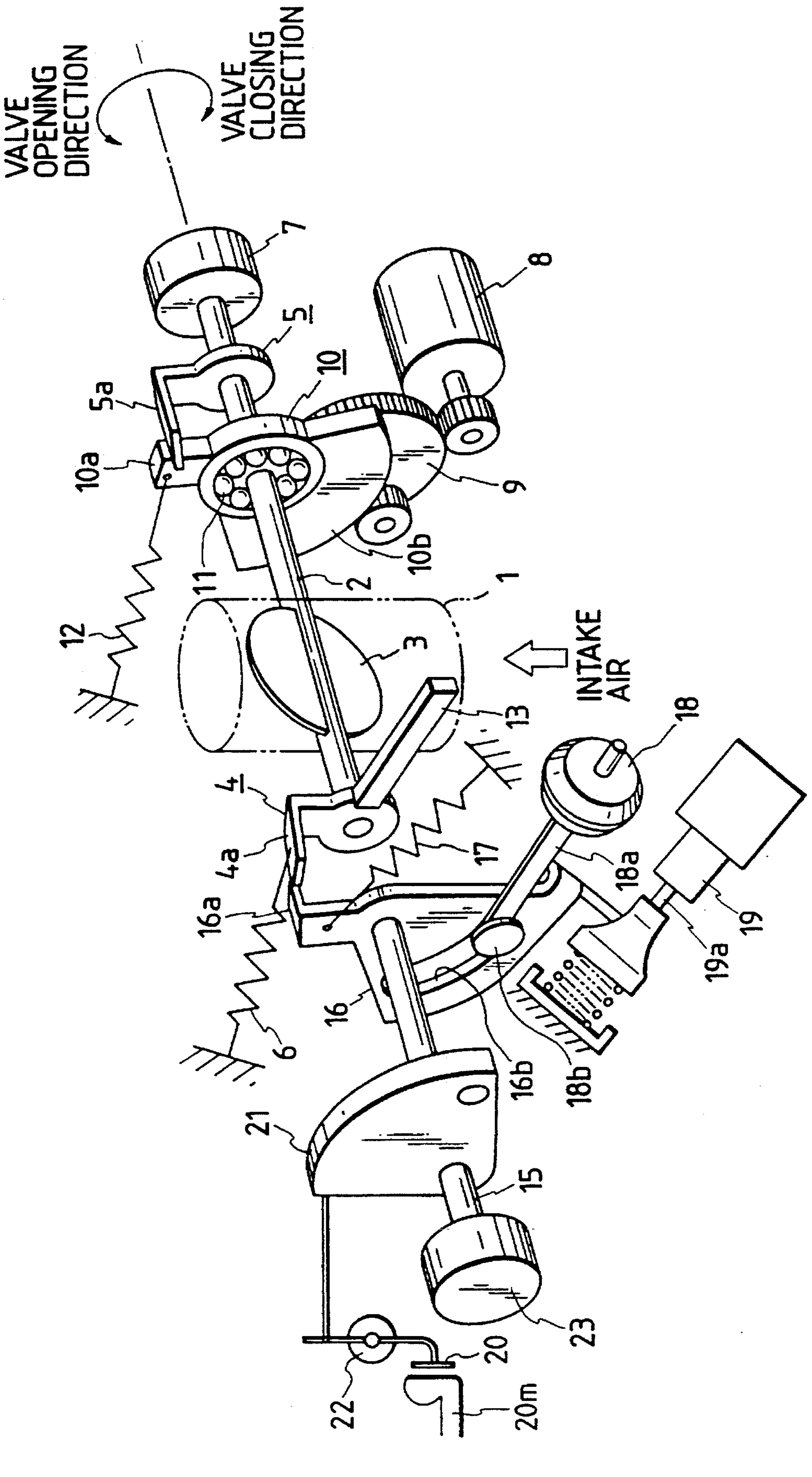
FIG. 2 is a view showing a configuration of the reference position detecting apparatus in accordance with the present invention.

Next, a configuration of the apparatus will be explained. FIG. 2 chiefly shows a throttle valve 3 and its drive mechanism, together with the reference position detecting apparatus in accordance with the present invention. An intake air passage 1, being shaped in a circular cylinder, is provided to introduce air into a combustion chamber (not shown) of an internal combustion engine, as is well known to the person skilled in the aft. At an appropriate position upstream of the combustion chamber, there is provided a throttle shaft 2, which extends transversely across the walls of the intake air passage 1. A throttle valve 3, being shaped in a circular disk, is secured to the throttle shaft 2 so as to be integrally rotated in response to the rotation of the throttle shaft 2. The throttle valve 3 can be swung within a predetermined rotatable angle of an approximately 90 degrees, from a first position where the throttle valve 3 completely closes the intake air passage 1 to a second position where the throttle valve 3 fully opens the intake air passage 1.

A pair of rotation members 4 and 5, being formed in an L-shape, is secured to the throttle shaft 2. One rotation member 4, disposed at the left hand of the intake air passage 1, is integrally formed with a bent piece 4*a*, to which one end of a valve spring 6 is connected. The other end of the valve spring 6 is fixed to an appropriate stationary member in the engine room. This valve spring 6 gives the throttle valve 3 an urging force in the direction that the throttle valve 3 is fully opened. In more detail, the throttle valve 3 is opened along an arrow (i.e. a valve opening direction) shown in FIG. 2 when the valve spring 6 itself contracts. On the contrary, the throttle valve 3 is closed along an arrow (i.e. a valve closing direction) shown in FIG. 2 when the valve spring 6 expands.

A throttle valve opening sensor 7, detecting an opening degree of the throttle valve 3, is provided at the right end of the throttle shaft 2.

A drive gear 10 is rotatably supported through a ball bearing 11 on and coaxially with the throttle shaft 2 between the throttle valve 3 and the rotation member 5. The rotation member 5 is disposed at the right hand of the intake air passage 1 next to the throttle valve opening sensor 7. The drive gear 10 has a protruding piece 10*a*, elongated radially from circumferential outer edge thereof. This protruding piece 10*a* extends upward in the drawing until the uppermost edge of the protruding piece 10*a* reaches a height at which the protruding piece 10*a* confronts with a bent piece 5*a* of the rotation member 5. As the valve spring 6 urges the rotation member 5 in the valve opening direction, the bent piece 5*a* is continuously pressed toward the protruding piece 10*a*. Thus, the bent piece 5*a* and the protruding piece 10*a* are firmly brought into contact with each other.

One end of a motor spring 12 is connected to the protruding piece 10*a*. The other end of the motor spring 12 is fixed with an appropriate stationary member in the engine room. This spring 12 urges the drive gear 10 in the valve opening direction. Besides the protruding portion 10*a*, the drive gear 10 has a sector portion 10*b* at an opposite, i.e. a lower, end thereof. The lower arc-shaped circumferential peripheral portion of the sector portion 10*b* is formed with gear teeth, with which a reduction gear 9 is meshed. The reduction gear 9 is further meshed with a DC motor 8. The DC motor can drive the drive gear 10 to rotate in the valve closing direction against the urging force of the valve spring 6 and the motor spring 12 both acting in the valve opening direction. If the drive gear 10 is rotated in the valve closing direction, the protruding portion 10*a* of the drive gear 10 presses the bent piece 5*a* of the rotation member 5 in the same direction. This rotational displacement of the drive gear 10 causes the throttle valve 3 to rotate in the valve closing direction.

The left-hand rotation member 4 is located at the left end of the throttle shaft 2, and is associated with a complete close stopper 13. The complete close stopper 13 is brought into contact with the rotation member 4 at a position where the throttle valve 3 is completely closed. Namely, when the throttle valve 3 is rotated in the valve closing direction in response to actuation of the DC motor 8, the bent piece 4*a* of the rotation member 4 abuts with the complete close stopper 13. Once the rotation member 4 is stopped by the complete close stopper 13, the throttle valve 3 is no more rotated in the valve closing direction. In this manner, the complete close stopper 13 determines the complete close position of the throttle valve 3.

A guard shaft 15, spaced left from the throttle shaft 2, is rotatably supported on the same axis as the throttle shaft 2. The guard shaft 15 is secured with a guard plate 16 at the right edge thereof. The guard plate 16 has a bent portion 16*a* which confronts with the bent portion 4*a* of the rotation member 4. When the throttle valve 3 rotates in the valve opening direction, the bent portion 4*a* of the rotation member 4 is brought into contact with the bent portion 16*a* of the guard plate 16. As the guard plate 16 acts as an obstacle (or a stopper) to the rotation member 4, the throttle valve 3 can no more rotate. That is, the guard plate 16 restricts the maximum opening angle of the throttle valve 3. One end of a guard spring 17 is connected with the guard plate 16. The other end of the guard spring 17 is fixed to an appropriate stationary member in the engine room. The guard spring 17 urges the guard plate 16 in the valve closing direction.

An accelerator pedal 20, which is depressed by a foot 20*m* of a driver, is linked with an accelerator lever 21. The accelerator lever 21 is secured with the guard shaft 15. If the depression amount of the accelerator pedal 20 is increased by the driver's foot 20*m*, the accelerator lever 21 rotates in the valve opening direction in accordance with this increased depression amount. At the same time, the guard plate 16 rotates in the same direction. This rotational displacement of the guard plate 16 allows the maximum opening angle of the throttle valve 3 to increase. An accelerator position sensor 22, detecting a depression amount of the accelerator pedal 20, is attached to the accelerator pedal 20.

Furthermore, a diaphragm actuator 18 is provided for an automatic cruising control of a vehicle. The diaphragm actuator 18 has a rod 18*a* extending toward the guard plate 16. A distal end 18b of the rod 18*a* is engaged with an arc-shaped elongated groove 16*b* opened on the guard plate 16. In a case where the accelerator pedal 20 is not depressed by the driver's foot 20*m*, the distal end 18*b* is positioned at the front end of the arc-shaped elongated groove 16*b* as shown in FIG. 2.

If the driver wants the vehicle to be driven by the automatic cruising control unit (not shown), he/she manipulates the automatic cruising control unit to set a vehicle speed to a preferable, e.g. 55 miles/hour, value. In response to the control signal fed from the automatic cruising control unit, the diaphragm actuator 18 pulls its rod **18*a* to rotate the guard plate 16 in the valve opening direction until the throttle valve 3 is sufficiently opened to attain a target vehicle speed. In this manner the throttle valve 3 can be operated by the diaphragm actuator 18 being associated with the automatic cruising control unit, while the accelerator pedal 20 is left without being depressed. The elongated groove 16*b* is formed to avoid an interference between the accelerator pedal 20 and the diaphragm actuator 18. An interference occurs when the accelerator pedal 20 is depressed by the driver's foot 20*m* while the automatic cruising control unit is deactivated. That is, the guard plate 16 must smoothly rotate in the valve opening direction without causing any interference with the rod 18*a* of the stationary or stopped diaphragm actuator 18. The elongated groove 16*b* is thus formed to allow the distal end 18*b* of the rod 18*a* to slide along this groove 16*b*, in order to avoid the interference between the rod 18*a* and the guard plate 16**.

A thermo-wax 19 is provided for the warming-up control of the internal combustion engine. The engine cooling water temperature is low, for example, in an engine cold start condition. As the thermo-wax 19 shrinks itself when cooled down, a rod **19*a* of the thermo-wax 19 contracts and thus the guard plate abutting with a part of this thermo-wax 19 at the lower edge thereof is rotated in the valve opening direction. Namely, the throttle valve 3 is slightly opened in an engine cold start condition. A rotational position of the guard plate 16 is detected by a guard sensor 23 disposed at the left end of the guard shaft 15**.

Hereinafter, with reference to FIG. 3 which schematically shows the constitution of the apparatus shown in FIG. 2, an operation of above-described reference position detecting apparatus for a throttle valve will be explained.

Figure 3:
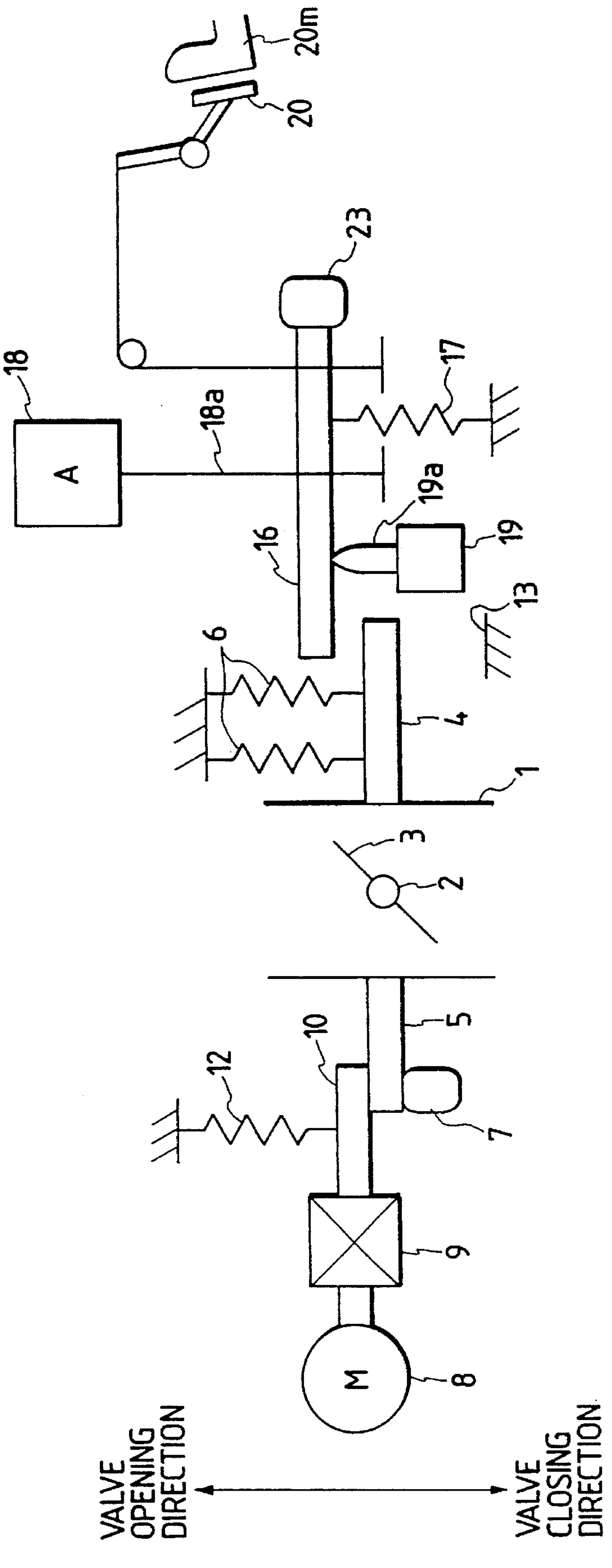
FIG. 3 is a view schematically showing the reference position detecting apparatus of FIG. 2.

In FIG. 3, an up direction is the valve opening direction of the throttle valve 3 and a down direction is the valve closing direction.

As already explained in the foregoing description, a rotational position of the guard plate 16 is determined in accordance with the following three control amounts, a depression amount of the accelerator pedal 20, a displacement amount of the diaphragm actuator 18, and a displacement amount of the thermo-wax 19. That is, these control amounts determine the maximum opening angle of the throttle valve 3.

For example, if the accelerator pedal 20 is depressed, the guard plate 16 is lifted upward in the drawing. The maximum opening angle of the throttle valve 3 is enlarged. Meanwhile, the throttle valve 3 is always urged in the valve opening direction (i.e. an upper direction in the drawing) by the valve spring 6. Furthermore, the throttle valve 3 is engaged with the DC motor 8 and the motor spring 12. Therefore, the opening degree of the throttle valve 3 is determined as a result of the balance of the following three forces, a driving force of the DC motor 8 acting in the valve closing direction (i.e. a lower direction in the drawing), a spring force of the valve spring 6 acting in the valve opening direction (i.e. an upper direction in the drawing), and a spring force of the motor spring 12 acting in the valve opening direction (i.e. an upper direction in the drawing).

Among three forces, only the driving force of the DC motor 8 can be controllable or adjustable. Therefore, if the throttle valve 3 is required to open to a desired degree smaller than the maximum opening angle defined by the guard plate 16, the balance among three forces is varied by increasing the driving force of the DC motor 8 against the urging forces of the springs 6 and 12 so as to rotate the throttle valve 3 in the valve closing direction (i.e. a lower direction in the drawing). The throttle valve 3 can be driven in the valve closing direction by the DC motor 8 until it reaches the complete close position. If the throttle valve 3 reaches the complete close position, the rotation member 4 is brought into contact with the complete close stopper piece 13.

Figure 1:
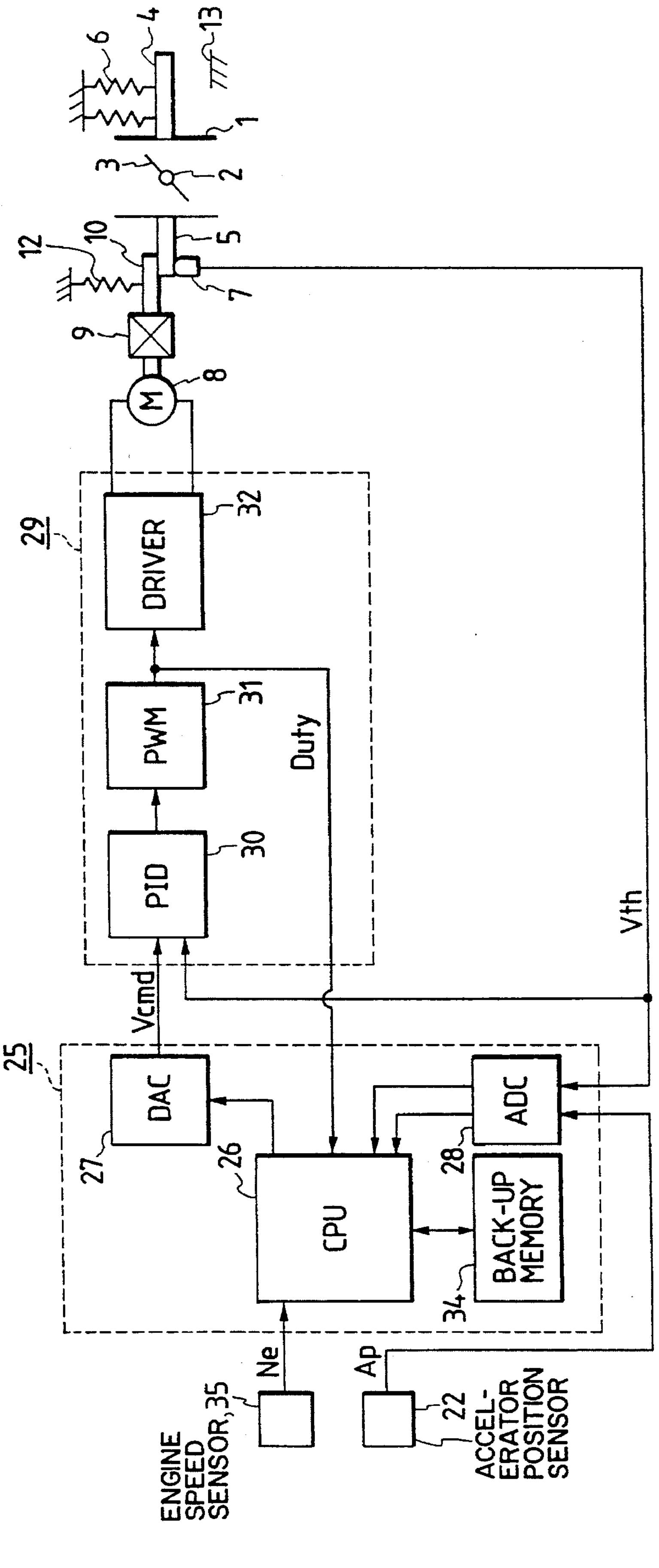
FIG. 1 is a circuit diagram showing an apparatus for detecting a reference position of a throttle valve opening in accordance with the present invention.

FIG. 1 is a circuit diagram showing the reference position detecting apparatus for a throttle valve 3. An electronic control unit (abbreviated as ECU) 25 includes a CPU 26, a D/A converter (abbreviated as DAC) 27, an A/D converter (abbreviated as ADC) 28, and a back-up memory 34. The CPU 26 inputs, through the A/D converter 28, signals from the throttle valve opening sensor 7 and the accelerator position sensor 22. On the basis of these input signals, the CPU 26 obtains both data of a throttle opening angle Vth and an accelerator depression amount Ap. The CPU 26 is also connected to an engine speed sensor 35 and obtains an engine speed Ne on the basis of a detected signal fed from this sensor 35.

Figure 7:
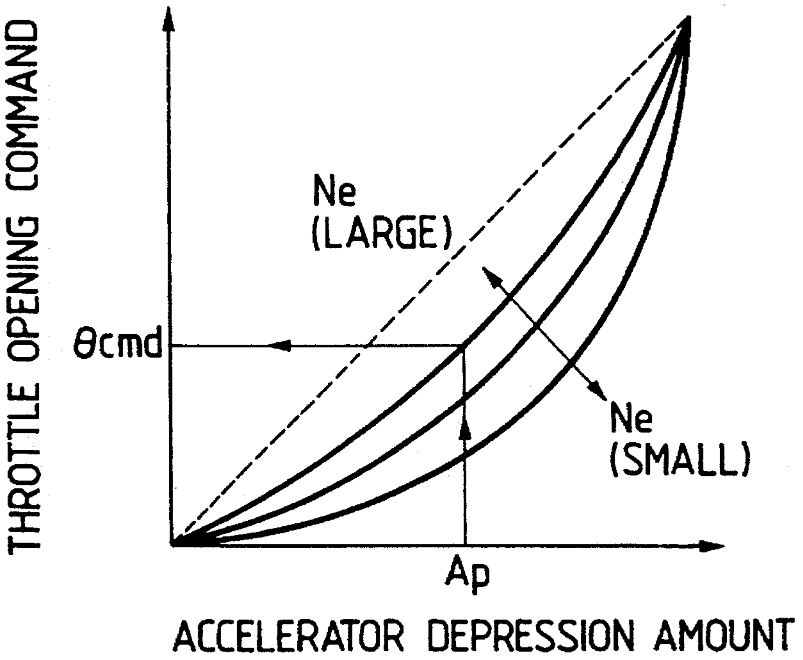
FIG. 7 is a graph showing a relationship between an accelerator depression amount and a throttle opening command value.

The CPU 26 carries out various arithmetic processings. For example, the CPU 26 uses the characteristics map shown in FIG. 7 in order to calculate the throttle opening command θcmd. FIG. 7 shows several curves representing the characteristics of the throttle opening command θcmd in accordance with different engine speeds Ne. As apparent from FIG. 7, the throttle opening command θcmd increases with increasing engine speed Ne at the same accelerator depression amount Ap. If the accelerator depression amount Ap and the engine speed Ne are both known, the throttle opening command θcmd is univocally determined from the characteristics map of FIG. 7. Therefore, the CPU 26 inputs the signals Ap and Ne detected by the sensors 22, 35 and obtains the throttle opening command θcmd with reference to the map of FIG. 7.

Figure 8:
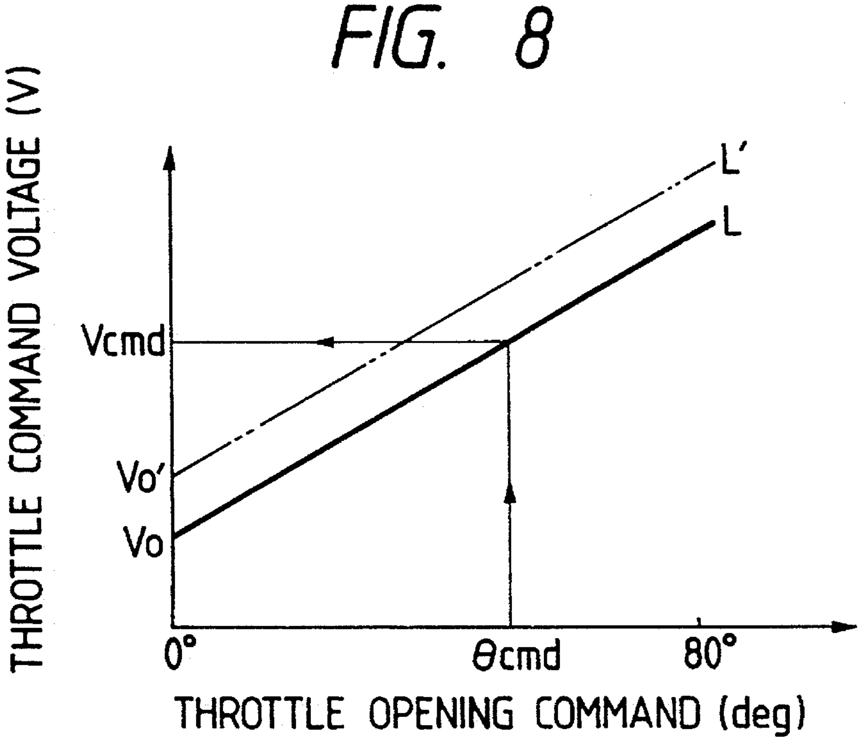
FIG. 8 is a graph showing a relationship between the throttle opening command and a throttle command voltage.

The CPU 26 further uses the characteristics map shown in FIG. 8 in order to calculate the throttle command voltage Vcmd. When the throttle opening command θcmd is known, the throttle command voltage Vcmd is univocally obtained from the characteristics map of FIG. 8. Therefore, the CPU 26 obtains the throttle command voltage Vcmd from the throttle opening command θcmd with reference to the map of FIG. 8.

The characteristic line L of FIG. 8 represents the relationship between the throttle opening command θcmd and the throttle command voltage Vcmd. This line L is reloadable in accordance with a complete close reference voltage V0 corresponding to the complete close position of the throttle valve 3. The back-up memory 34 memorizes the complete close reference voltage V0 irrespective of the turning on and off operation of a key switch of an internal combustion engine.

A DC motor driving circuit 29, shown in FIG. 1, includes a PID control circuit 30, a PWM (i.e. pulse width modulation) circuit 31, and a driver circuit 32. The PID control circuit 30 inputs the throttle command voltage Vcmd calculated by the CPU 26 and the throttle opening angle Vth detected by the throttle valve opening sensor 7 to detect a deviation ε between these two signals. The PID control circuit 30 executes all the proportional, integral, and differential controls for eliminating the deviation ε. The control value of the throttle valve 3 is obtained as a result of above PID operation, and fed to the PWM circuit 31.

The PWM circuit 31 converts the control value supplied from the PID control circuit 30 into a duty-ratio signal Duty. The driver 32 servo-controls the DC motor 8 in accordance with thus obtained duty-ratio signal Duty.

The duty-ratio signal Duty is further supplied from the PWM circuit 31 to the CPU 26. In the CPU 26, this signal is utilized to detect the motor lock. That is, when the throttle valve 3 reaches the complete close position, the DC motor 8 causes the lock current. This lock current can be known by checking the magnitude of the duty-ratio signal Duty. Therefore, the CPU 26 monitors the motor lock on the basis of this duty-ratio signal Duty.

In this embodiment, as described above, the PID control circuit 30 produces the duty-ratio signal Duty based on the deviation ε between the throttle command voltage Vcmd and the throttle opening angle Vth. Once the throttle valve 3 has reached the complete close position, this deviation ε is no longer converged at 0 due to the motor lock of the DC motor 8. The duty-ratio signal Duty rather increases abruptly in this instance. Accordingly, the CPU 26 sets a criterion for detecting the motor lock condition. In more detail, the CPU 26 concludes that the DC motor 8 has been locked if the magnitude of the duty-ratio signal Duty exceeds a predetermined value (e.g. 85%) continuously for more than a predetermined period of time.

In this embodiment, the valve spring 6 serves as an urging member, and the complete close stopper piece 13 serves as a stopper member. Furthermore, the CPU 26 serves as a lock current detecting means and a throttle valve reference position renewing means.

Next, an operation of the reference position detecting apparatus in accordance with the present invention will be explained with reference to FIGS. 4 and 5(A)~5(F).

Figure 4:
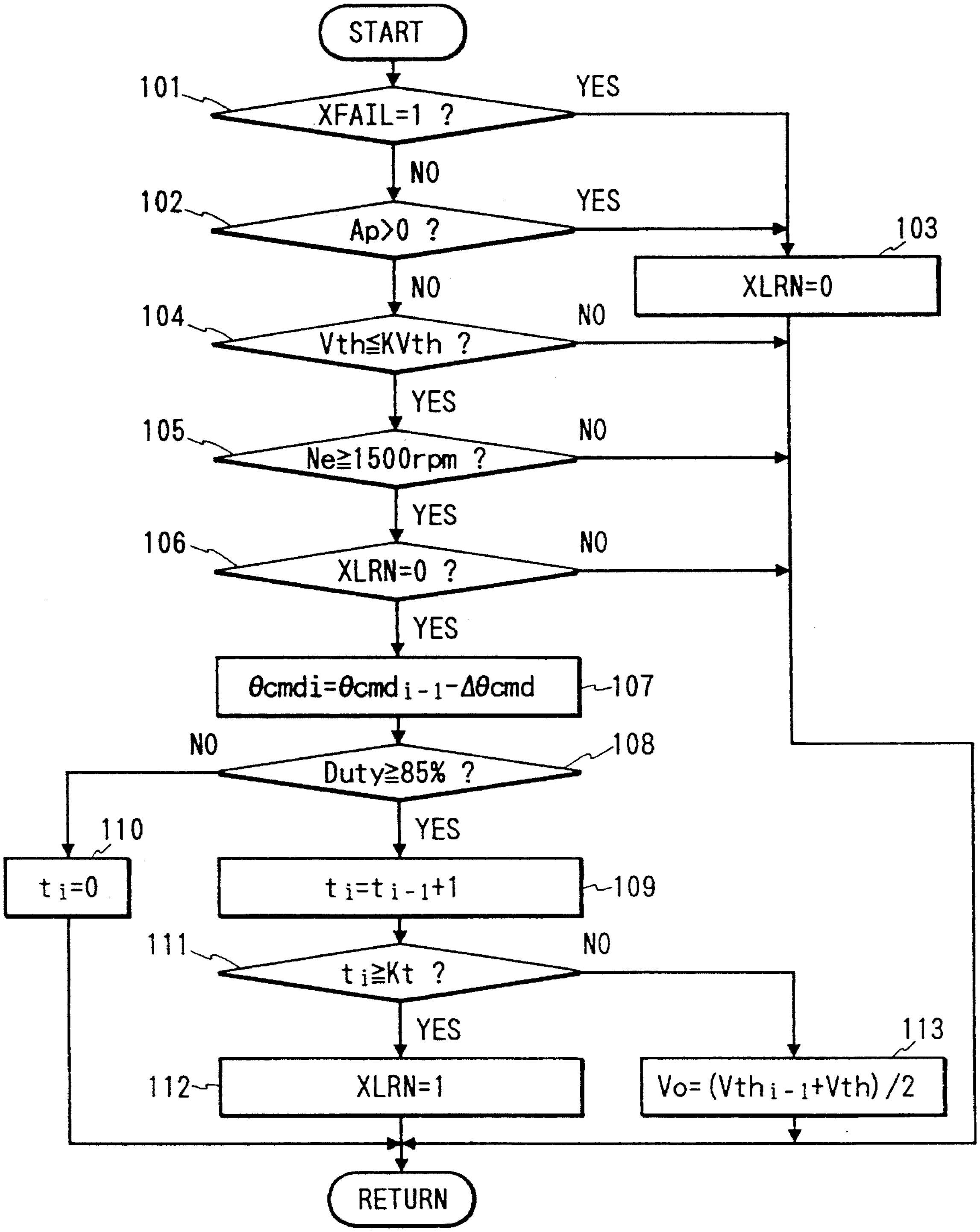
FIG. 4 is a flowchart showing a learning routine of the reference voltage representing a complete close position.

FIG. 4 is a flowchart showing a learning routine of the complete close reference voltage V0. The CPU 26 carries out this routine at predetermined intervals. FIGS. 5(A)~5(F) are time charts illustrating respective changes in accordance with the procedure of this learning routine, with respect to the throttle valve opening degree (i.e. the throttle command voltage Vcmd, and the throttle opening angle Vth), the accelerator depression amount Ap, the motor current, the duty-ratio signal Duty, the counter value ti, and the learning execution flag XLRN. Hereinafter, together with this timing chart, the flowchart of FIG. 4 will be explained in detail.

Figures 5A, 5B, 5C, 5D, 5E, 5F:
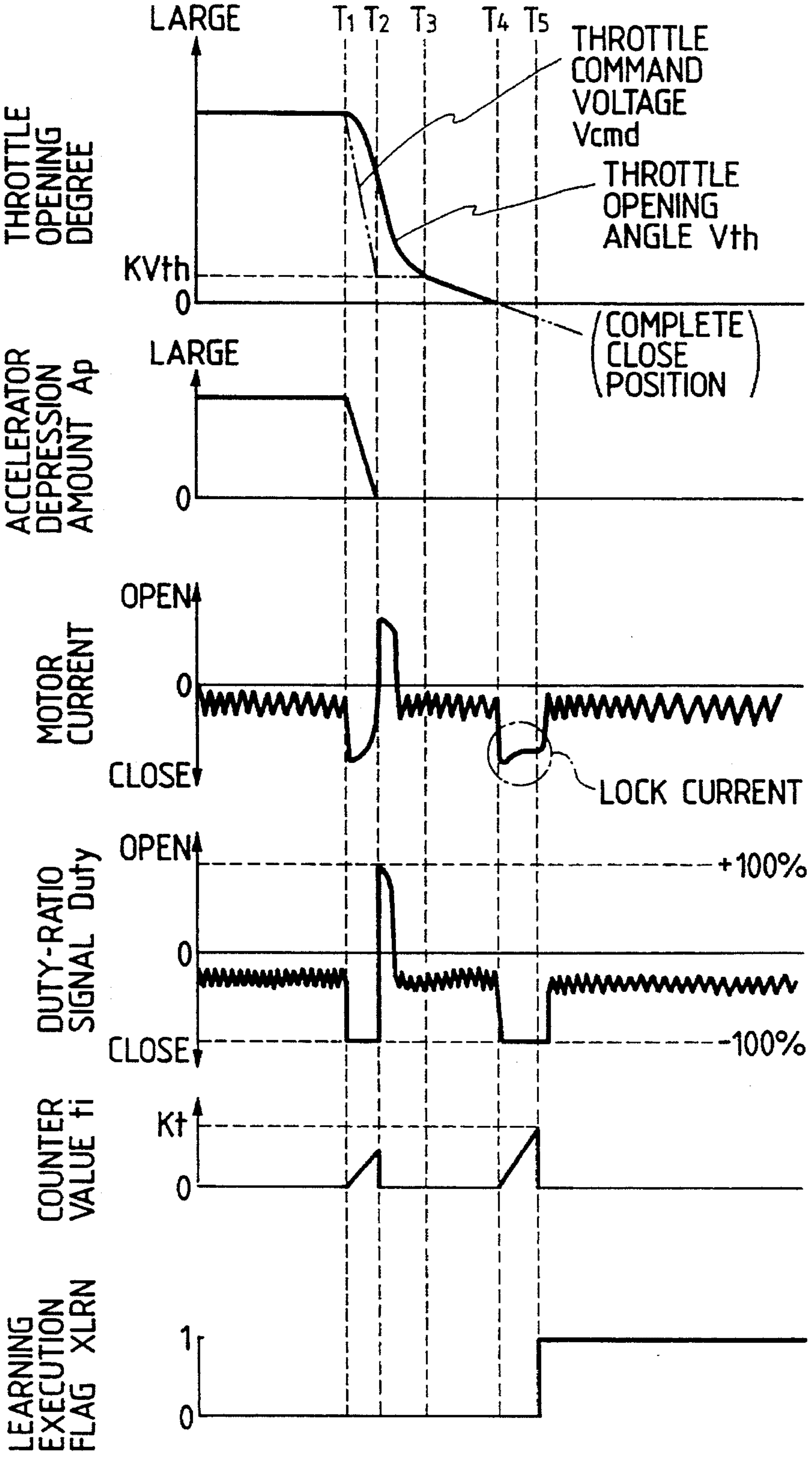
FIGS. 5(A)~5(F) are time charts illustrating the procedure of the learning routine of FIG. 4.

In FIG. 5(A), it is supposed that the throttle valve opening degree has been maintained at a desired angle till a timing T1. At the timing T1, the accelerator pedal 20 is suddenly no more depressed. Thereafter, the throttle valve 3 is driven by the DC motor 8 in the valve closing direction.

The CPU 26 first of all judges whether or not a failure flag XFAIL is "1" in a step 101. This failure flag XFAIL is set by a failure detecting routine described later. The value "1" of this failure flag XFAIL indicates that the failure condition is found or detected. If the judgement in the step 101 is NO, the CPU 26 proceeds to the next step 102 to make a judgement as to whether or not the accelerator depression amount Ap detected by the accelerator position sensor 22 is greater than "0". If the judgement in the step 102 is YES, the CPU 26 proceeds to a step 103 to reset the learning execution flag XLRN to "0" and thereafter ends this routine. Meanwhile, if the judgement in the step 102 is NO, the CPU 26 proceeds to a step 104.

This procedure will be well understood from the timing charts of FIGS. 5(A)~5(F). The CPU 26 repeats the same procedure of steps 101, 102, and 103 till the timing T1. As shown in FIGS. 5(A), 5(C), and 5(D), the throttle opening is maintained at a predetermined angle, and the motor current and the duty-ratio signal Duty are both kept at constant values. These values are control amounts for driving the DC motor 8 in the valve closing direction. That is, the CPU 26 calculates the throttle opening command θcmd from the accelerator depression amount Ap and the engine speed Ne with reference to the map of FIG. 7. And further, the CPU 26 obtains the throttle command voltage Vcmd from the throttle opening command θcmd with reference to the map of FIG. 8. The DC motor driving circuit 29 actuates the DC motor 8 in accordance with this throttle command voltage Vcmd so as to adjust the opening degree of the throttle valve 3 at a desired angle.

Then, if the accelerator pedal 20 is no more depressed at the timing T1, the motor current and the duty-ratio signal Duty are both shifted abruptly in the valve closing direction. If the accelerator depression amount Ap is decreased to 0 at the timing T2, the throttle command voltage Vcmd decreases down to a predetermined value KVth and the motor current and the duty-ratio signal Duty are once largely shifted from the valve closing direction to the valve opening direction.

Next, the CPU 26 makes a judgement in the step 104 as to whether or not the throttle opening angle Vth is not larger than a predetermined value KVth. At the timing T3, the throttle opening angle Vth becomes not larger than the predetermined value KVth. Therefore, the CPU 26 proceeds to the a step 105.

The CUP 26 makes a judgement in the step 105 whether or not the engine speed Ne is not less than a predetermined speed (e.g. 1500 rpm). If the judgement in the step 105 is YES, the CPU 26 proceeds to a step 106 to make a judgement as to whether or not the learning execution flag XLRN is "0". If the learning execution flag XLRN is "0", the CPU 26 proceeds to a step 107. If any one of the judgements of steps 104 to 106 is NO, the CPU 26 ends this routine.

After going on to the step 107, the CPU 26 renews the throttle opening command θcmd in accordance with the following equation (1).

$$\theta cmd_i = \theta cmd_{i-1} - \Delta\theta cmd \quad (1)$$

Wherein, $\theta cmd_i$ is a newly obtained throttle opening command, $\theta cmd_{i-1}$ is a throttle opening command having been obtained in the previous routine, and Δθcmd is a small opening degree (e.g. 0.1°).

Subsequently, the CPU 26 calculates the throttle command voltage $Vcmd_i$ from the renewed throttle opening command $\theta cmd_i$ with reference to the map of FIG. 8, and supplies thus obtained throttle command voltage $Vcmd_i$ to the DC motor driving circuit 29. The DC motor driving circuit 29 converts the throttle command voltage $Vcmd_i$ to the duty-ratio signal Duty through the pulse width modulation, so as to actuate the DC motor 8.

As apparent from the FIG. 5(A), the throttle valve 3 is rotated gradually in the valve closing direction between the timings T3 and T4, in response to the small opening degree Δθcmd obtained in the step 107.

Thereafter, the CPU 26 makes a judgement in a step 108 whether or not an amount of the duty-ratio signal Duty is not less than a predetermined value (e.g. 85%). If the duty-ratio signal Duty is less than 85% in a time period between the timings T3 and T4, the CPU 26 proceeds to a step 110 to reset the counter $t_i$ to 0 and ends this routine.

The throttle valve 3 reaches the complete close position at the timing T4. As soon as the bent piece 4*a* of the rotation member 4 is brought into contact with the complete close stopper piece 13, the motor current promptly shifts in the valve closing direction to cause the motor lock current. The duty-ratio signal Duty also changes in the same direction. As the PID control circuit 30 of this embodiment has an excellent responsibility in the integral component with respect to the deviation $\epsilon$, the duty-ratio signal Duty abruptly increases as shown in FIG. 5(D). As a result, the duty-ratio signal Duty comes to exceed 85% and therefore the CPU 26 proceeds to a step 109 to increment the counter $t_i$ by "1". (That is $t_i$, $t_{1-1}+1$.)

Then, the CPU 26 makes a judgement in a step 111 as to whether or not the value of the counter $t_i$ is not less than a predetermined Kt. Namely, in this step 111 it is found whether or not the predetermined time Kt has elapsed since the throttle valve 3 reached the complete close position. If the value of the counter $t_i$ is less than the predetermined time Kt, the CPU 26 proceeds to a step 113.

In the step 113, the CPU 26 calculates the complete close reference voltage V0 from the throttle opening angle Vth in accordance with the following equation (2).

$$V0=(Vth_{i-1}+Vth_i)/2 \quad (2)$$

Namely, the complete close reference voltage V0 is obtained by an arithmetical mean of the latest throttle opening angle $Vth_i$ and the previous throttle opening angle $Vth_{i-1}$ obtained by the throttle valve opening sensor 7.

The CPU 26 gives a renewed complete close reference voltage V0' instead of the complete close reference voltage V0 of FIG. 8. Thus, the characteristic curve L is replaced by a new characteristic curve L'. Also, the complete close reference voltage V0 stored in the back-up memory 34 is replaced by the newly obtained complete close reference voltage V0'.

On the other hand, if the value of the counter $t_i$ becomes not less than the predetermined value Kt at the T5, the CPU 26 proceeds from the step 111 to a step 112 to set the learning execution flag XLRN to "1" and ends this routine. By the way the predetermined value Kt has to be set to a large value, so that the value of the counter $t_i$ does not exceed this predetermined value Kt in the normal motor driving operation. In fact, the value of the counter $t_i$ does not exceed Kt between the timings T1 and T2, as shown in FIG. 5(E).

After the renewal of the complete close reference voltage from V0 to V0', the CPU 26 calculates the throttle command voltage Vcmd from the throttle opening command θcmd with reference to the newly determined characteristic line L'.

Figure 9:
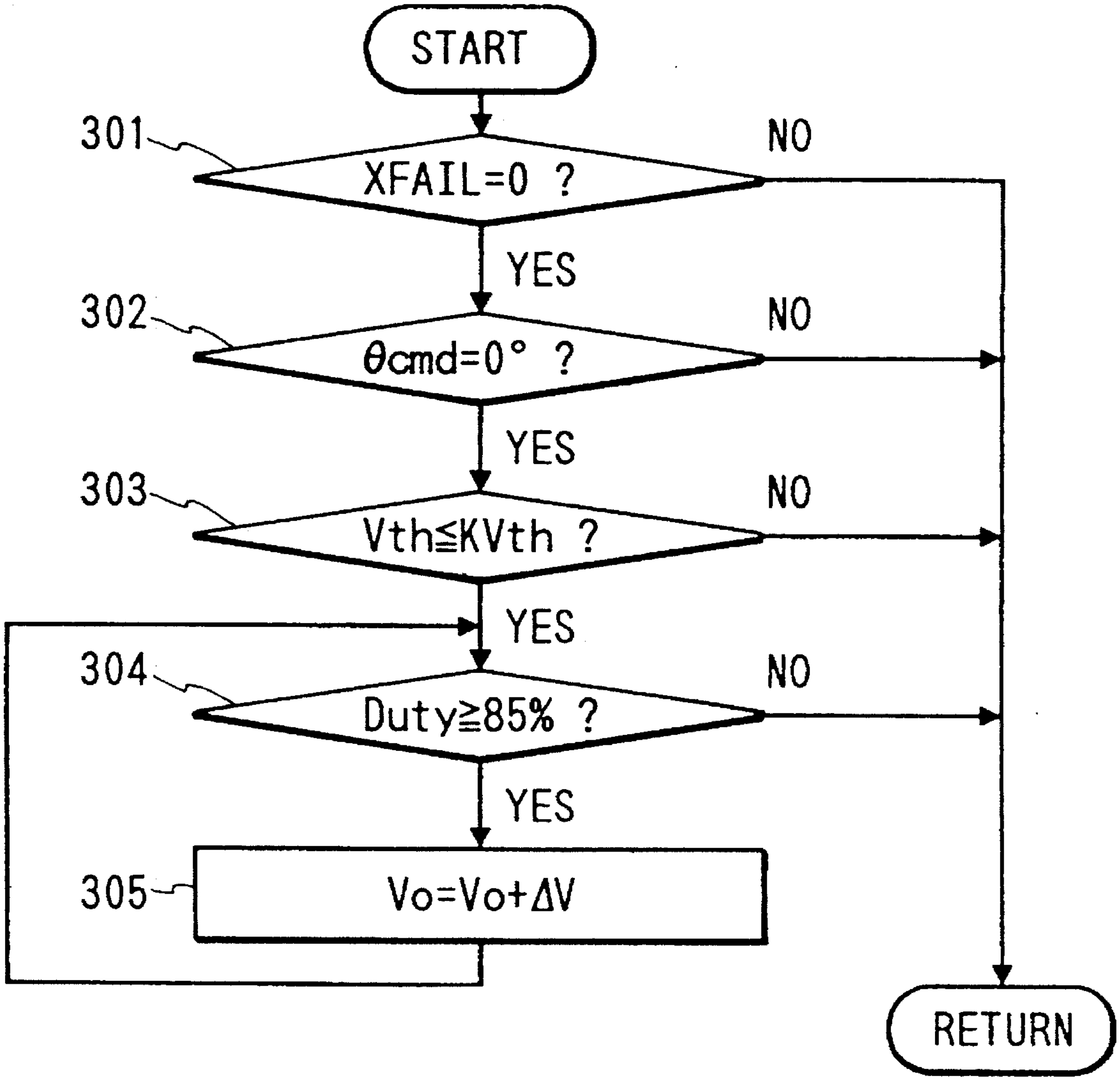
FIG. 9 is a flowchart showing an error detecting routine for avoiding an error in the learning procedure.

Next, an error detecting routine for avoiding an error in the learning procedure will be explained with reference to FIG. 9. A learning error causes due to noise and others. The CPU 26 first of all makes a judgement in a step 301 as to whether or not the failure flag XFAIL is "0". This failure flag XFAIL is used in the routine shown in FIG. 10 and will be explained later in a routine shown in FIG. 6. If the judgement in the step 301 is YES, the CPU 26 proceeds to a step 302 to further make a judgement as to whether or not the throttle opening command θcmd is "0". If the judgement in the step 302 is YES, the CPU 26 proceeds to a step 303 to further make a judgement as to whether or not the throttle opening angle Vth detected by the throttle opening sensor 7 is not larger than the predetermined KVth. If the judgement in the step 303 is YES, the CPU 26 proceeds to a step 304.

In the step 304, the CPU 26 makes a judgement as to whether or not the duty-ratio signal Duty is not less than 85%. If the duty-ratio signal Duty exceeds 85%, it means that the DC motor 8 is still driven in the valve closing direction nevertheless the rotation member 4 has already brought into contact with the complete close stopper piece 13 in the closing movement of the throttle valve 3. In other words, it is found that the complete close reference voltage V0 was excessively small in above case. Therefore, if the duty-ratio signal Duty exceeds 85% in the step 304, the CPU 26 concludes that the renewal of the complete close reference voltage V0 is required. The CPU 26 then proceeds to a step 305 to renew the complete close reference voltage V0.

In the step 305, the CPU 26 modifies the complete close reference voltage V0 by adding a small amount, e.g. 1 mV, of a voltage ΔV. (That is, V0=V0+ΔV). Thereafter, the CPU 26 repeats the same procedure of the step 305 until the duty-ratio signal Duty is reduced less than 85%.

Executing such a procedure is useful in a sense of eliminating an adverse affection of noise contained in the output of the throttle valve opening sensor 7. If the output of the throttle valve opening sensor 7 includes a noise component, the complete close reference voltage V0 may accidentally be learned to be a much smaller value. However, repeating above procedure of steps 304 and 305 soon eliminates such an error in the learning operation.

As described in the foregoing description, according to the reference position detecting apparatus of the present invention, the DC motor 8 is driven in the valve closing direction in accordance with the command value when the throttle valve 3 has reached the complete close position, until the rotation member 4 integrally rotating together with the throttle valve 3 is brought into contact with the complete close stopper piece 13.

Then the lock current, generated at the moment the rotation member 4 abuts the complete close stopper piece 13, is detected indirectly from the increase of the duty-ratio signal Duty. In response to the detected lock current (i.e. duty-ratio signal Duty), the CPU 26 obtains the complete close position. Furthermore, the complete close reference voltage V0 is renewed in accordance with the detected complete close position. An adjustment of the opening degree of the throttle valve 3 is carried out in accordance with the renewed complete close reference voltage V0'.

With this arrangement, there is no need to install a complete close switch which is required in the conventional detecting apparatus. Accordingly, the present invention ensures the accurate detection of the complete close reference position without being bothered by the installation error of the complete close detecting switch. As the present invention requires no switch specially for the detection of the complete close position, an overall construction of the detecting system will be more simplified compared with the conventional one. The cost will be also reduced.

Figure 6:
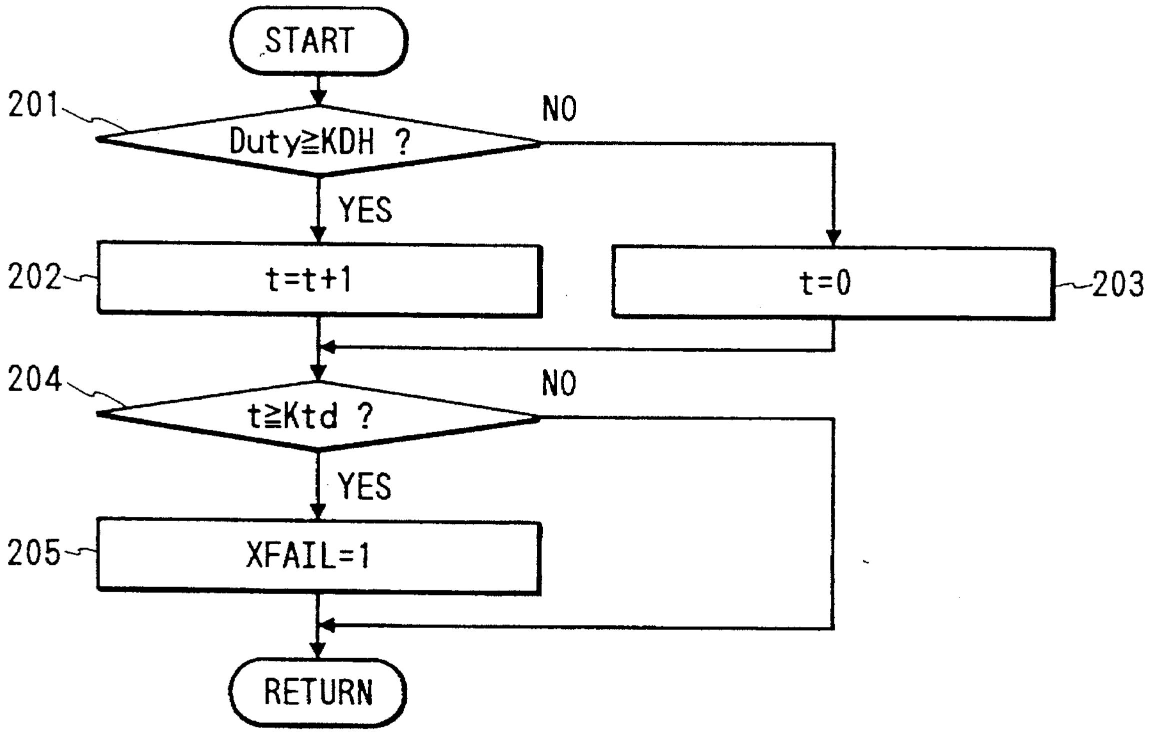
FIG. 6 is a flowchart showing a failure detecting routine for detecting an excessively large current failure.

Next, failure detecting routines will be described with reference to FIGS. 6 and 10. FIG. 6 is a flowchart showing a failure detecting routine for detecting an excessively large current failure (e.g. valve lock or stick etc.). In FIG. 6, the CPU 26 first of all makes a judgement in a step 201 as to whether or not the duty-ratio signal Duty, currently generated from the DC motor driving circuit 29, is not less than a predetermined duty-ratio KDH (e.g. 90%). If the duty-ratio signal Duty is less than the predetermined duty-ratio KDH, the CPU 26 proceeds to a step 203 to reset the counter t to "0". Thereafter, the CPU 26 goes on to a step 204 to make a judgement as to whether or not the counter t is not less than a predetermined time Ktd. As the counter value is "0", the CPU 26 ends this routine.

On the other hand, if the duty-ratio signal Duty is not less than the predetermined duty-ratio KDH in the step 201, the CPU 26 proceeds to a step 202 to increment the counter t by "1". That is, the CPU 26 concludes that the throttle valve 3 must be failed if the duty-ratio signal Duty exceeds 90%. Then the CPU 26 continues to increment the counter t by "1" as long as the failure of the throttle valve 3 is detected.

Subsequently, the CPU 26 proceeds to the step 204. As the counter value is smaller than the predetermined time Ktd in the beginning, the CPU 26 ends this routine. However, the counter t increases its value through the procedure of step 202 as time elapses. If the counter value becomes not less than the predetermined time Ktd in the step 204, the CPU 26 goes on to a step 205 to set the failure flag XFAIL to "1".

Figure 10:
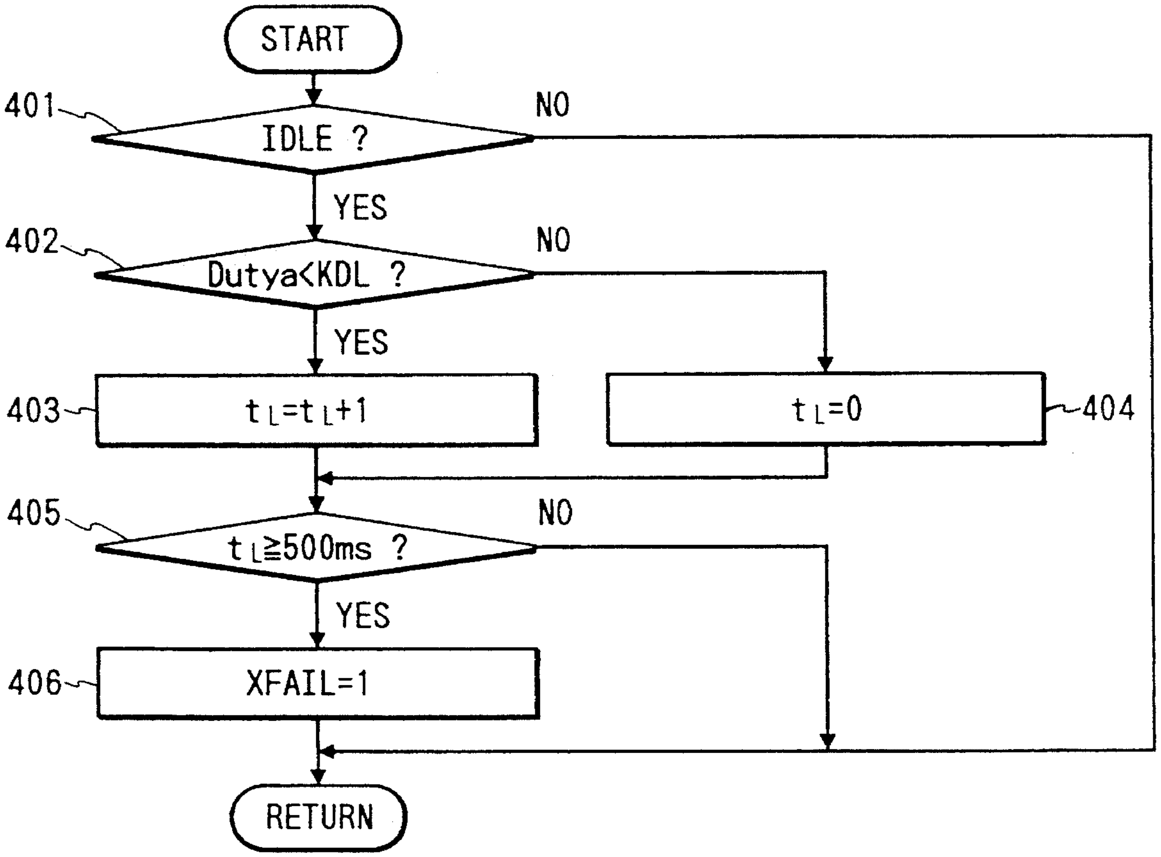
FIG. 10 is a flowchart showing another failure detecting routine for detecting an excessively small current failure.

FIG. 10 is a flowchart showing another failure detecting routine for detecting an excessively small current failure. The CPU 26 makes a judgement in a step 401 as to whether or not the engine is in an idle condition. In more detail, the idle condition of the engine is detected by checking whether or not the accelerator depression amount Ap is not larger than a predetermined value or the opening angle of the throttle valve 3 is not larger than a predetermined value. If the engine is in an idle condition, the CPU 26 proceeds to a step 402 to make a judgement as to whether or not an average value (Dutya) of the duty-ratio signals Duty is less than a predetermined value KDL. The duty-ratio signal average Dutya is obtained in accordance with the following equation (3).

$$Dutya = \left( \sum_{i=1}^{n} Duty_i \right) / n \qquad (3)$$

Wherein, n is a positive integer.

The CPU 26 goes on to a step 402 if the Dutya is less than the KDL. In the step 402, a counter $t_L$ is incremented by "1". Then, the CPU 26 proceeds to the next step 405. On the other hand, if the Dutya is not less than the KDL, the CPU 26 goes on to a step 404 to reset the counter $t_L$ to "0", and thereafter goes on to the step 405.

In the step 405, the CPU 26 makes a judgement as to whether or not the value of the counter $t_L$ is not less than a predetermined period of time (e.g. 500 msec). If the judgement in the step 405 is YES, the CPU 26 sets the failure flag XFAIL to "1" in a step 406.

The excessively small current failure occurs, for example, when the valve spring 6 is damaged or cut. The procedure of above-described routine with reference to FIG. 10 can ensure the detection of this kind of failure. For this purpose, it will be preferable to use a throttle valve of a normal-close type. This throttle valve will be urged in the valve closing direction, so that the rotation member is brought contact with the stopper member at the complete close position of the throttle valve.

Furthermore, it is also preferable to use an ammeter for directly detecting the lock current of the motor.

As is described in the foregoing description, the present invention realizes a reference position detecting apparatus with a novel constitution which is capable of increasing accuracy in the detection of the throttle valve opening degree.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A servo control apparatus comprising:

a DC motor;

position detecting means for producing a detection signal representing a rotational position of said DC motor;

target command means for producing a command signal representing a target rotational position of said DC motor;

duty control means for determining, based upon a deviation between said detection signal produced by said position detecting means and said command signal produced by said target command means, a duty-ratio signal to be supplied to said DC motor, so as to supply said DC motor with an exciting current that is adjusted in accordance with said duty-ratio signal;

motor lock judging means for receiving said duty-ratio signal produced by said duty control means and for determining, based upon said duty-ratio signal, whether or not said DC motor is in a locked condition; and reference position memory means for memorizing a reference position corresponding to said detection signal produced by said position detecting means when said motor lock judging means determines that said DC motor is in said locked condition.

2. A servo control apparatus in accordance with claim 1, wherein said duty control means performs at least an integral control in accordance with said deviation between said detection signal produced by said position detecting means and said command signal produced by said target command means.

3. A servo control apparatus in accordance with claim 2, wherein said DC motor includes an actuator for driving a throttle valve, which is equipped in an intake air passage of an internal combustion engine.

4. An apparatus for detecting a reference position of a valve comprising:

a throttle valve, which is forced by an urging force created by an urging member in one of a valve opening direction and a valve closing direction;

a DC motor, connected to said throttle valve, for driving said throttle valve against said urging force of said urging member within a rotatable angle that is restricted by a stopper member;

a throttle valve opening sensor for detecting an opening angle of said throttle valve;

lock current detecting means for detecting a lock current created in said DC motor when said throttle valve is brought into contact with said stopper member;

throttle valve reference position memory means for storing a reference position of said throttle valve; and throttle valve reference position renewing means for renewing, based upon said opening angle of said throttle valve, which is detected by said throttle valve opening sensor, said reference position stored in said throttle valve reference position memory means when said lock current detecting means detects said lock current.

5. An apparatus for detecting a reference position of a servo-controlled throttle valve comprising:

a DC motor which receives an exciting current from a driving circuit;

duty control means for producing, based upon a deviation between an actual throttle position value and a command value, which represents a target throttle position, a duty-ratio signal for controlling said DC motor, so as to equalize said actual throttle position value with said command value;

position detecting means for detecting said actual throttle position value;

target value command means for determining said command value;

motor lock judging means for monitoring whether said DC motor is in a motor lock condition; and memory means for storing a reference value representing a reference position of said throttle valve, said memory means renewing, based upon said actual throttle position value detected by said position detecting means at the moment when said motor lock judging means detects said motor lock condition, said reference value.

6. An apparatus in accordance with claim 5, wherein said motor lock judging means supplies said memory means with a signal which indicates that said DC motor has reached said reference position, and said memory means calculates, upon receipt of said signal from said motor lock judging means, said reference value in accordance with said actual throttle position value detected at the moment said signal from said motor lock judging means is received and stores said calculated reference value.

7. An apparatus in accordance with claim 5, wherein said memory means erases said stored reference value and stores said actual throttle position value detected at said reference position as a renewed reference value.

8. An apparatus in accordance with claim 5, wherein said memory means modifies said reference value by a predetermined amount so as to reduce a difference between said reference value and said actual throttle position value detected at said reference position.

9. An apparatus in accordance with claim 8, wherein said renewed reference value is supplied by said memory means to said target value command means, in which said command value is calculated in accordance with said renewed reference value.

10. An apparatus in accordance with claim 5, wherein said target value command means memorizes a target value characteristic as a function of an accelerator depression amount, and obtains a command value corresponding to an accelerator depression amount detected by an accelerator sensor.

11. An apparatus in accordance with claim 10, wherein said target value characteristic defines said reference value as a minimum value of the command value.

12. An apparatus in accordance with claim 5, wherein said motor lock judging means detects said motor lock condition by examining said duty-ratio signal supplied from said duty control means.

13. An apparatus in accordance with claim 12, wherein said motor lock judging means determines that said DC motor is in said motor lock condition when a motor current continuously exceeds a predetermined value for longer than a predetermined period of time.

14. An apparatus in accordance with claim 5, wherein said motor lock judging means detects said motor lock condition by examining a motor lock current.

* * * * *